US011661024B2

United States Patent
Ko et al.

(10) Patent No.: US 11,661,024 B2
(45) Date of Patent: May 30, 2023

(54) KNEE AIRBAG

(71) Applicant: HYUNDAI MOBIS CO., LTD., Seoul (KR)

(72) Inventors: Seok Hoon Ko, Yongin-si (KR); Do Hyoung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/930,355

(22) Filed: Sep. 7, 2022

(65) Prior Publication Data

US 2023/0135921 A1 May 4, 2023

(30) Foreign Application Priority Data

Oct. 29, 2021 (KR) .................. 10-2021-0146533

(51) Int. Cl.
*B60R 21/206* (2011.01)
*B60R 21/2165* (2011.01)
*B60R 21/015* (2006.01)
*B60R 21/00* (2006.01)
*B60R 21/16* (2006.01)

(52) U.S. Cl.
CPC ...... *B60R 21/206* (2013.01); *B60R 21/01538* (2014.10); *B60R 21/2165* (2013.01); *B60R 2021/0051* (2013.01); *B60R 2021/161* (2013.01)

(58) Field of Classification Search
CPC .................. B60R 21/206; B60R 2021/161
See application file for complete search history.

(56) References Cited

U.S. PATENT DOCUMENTS

| 11,498,511 | B2 * | 11/2022 | Walker | B60R 21/233 |
| 2016/0297392 | A1 * | 10/2016 | Schneider | B60R 21/231 |
| 2018/0162309 | A1 * | 6/2018 | Kim | B60N 2/4221 |
| 2022/0001822 | A1 * | 1/2022 | Campbell | B60R 21/0152 |

FOREIGN PATENT DOCUMENTS

| CN | 111216670 A | * | 6/2020 | ......... B60R 21/013 |
| DE | 102019208417 A1 | * | 12/2020 | ......... B60R 21/013 |
| DE | 102020120476 A1 | * | 2/2022 | |
| EP | 1733930 A2 | * | 12/2006 | ......... B60R 21/206 |
| JP | 2013039863 A | * | 2/2013 | |
| JP | 2016043711 A | * | 4/2016 | |
| KR | 2016-0024256 | | 3/2016 | |
| KR | 20190117855 A | * | 10/2019 | |
| WO | WO-2019076673 A1 | * | 4/2019 | ......... B60R 21/201 |

OTHER PUBLICATIONS

English Language Abstract of KR 2016-0024256 published Mar. 4, 2016.

* cited by examiner

*Primary Examiner* — Nicole T Verley
(74) *Attorney, Agent, or Firm* — DLA Piper LLP (US)

(57) ABSTRACT

A knee airbag configured to rapidly restrain the knees of a passenger and reduce the risk of injury to the passenger by changing a deployment angle of the airbag depending on a seated state of the passenger, the knee airbag including an airbag module coupled to a hinge structure inside a cockpit and configured to rotate around the hinge structure to change a deployment direction of a cushion, a driving unit configured to provide rotational force to the airbag module, and a controller configured to adjust a rotation angle of the airbag module by operating the driving unit based on the seated state of the passenger.

6 Claims, 5 Drawing Sheets

KNEE AIRBAG

CROSS-REFERENCE TO THE RELATED APPLICATION

This application claims priority from Korean Patent Application No. 10-2021-0146533, filed on Oct. 29, 2021, in the Korean Intellectual Property Office, the disclosure of which is incorporated herein by reference in its entirety.

BACKGROUND OF THE INVENTION

Field of the Invention

The present invention relates to a knee airbag configured to rapidly restrain the knees of a passenger and reduce the risk of injury to the passenger by changing a deployment angle of the airbag depending on a seated state of the passenger.

Description of the Related Art

A knee airbag device is a device configured to allow an airbag cushion to be deployed between a cockpit and the knees of a passenger, thereby protecting the knees of the passenger.

The knee airbag device has an airbag module installed inside an instrument panel, and an inflator serving as a gas generation mechanism and the airbag cushion are accommodated in the airbag module. Here, in the event of vehicle collision, gas generated from the inflator is provided into the airbag cushion, and the airbag cushion is deployed upwards toward the passenger, thereby making it possible to protect the knees of the passenger.

Meanwhile, recently, as one of the methods of increasing the utilization of interior space of a vehicle, a cockpit is designed to be slim.

However, due to the slimming of the cockpit, the size thereof in the forward-and-rearward direction is significantly reduced compared to a cockpit of the related art, and as such, a distance between the cockpit and the passenger increases, which results in delays in restraining the knees of the passenger due to the increased distance therebetween and insufficient space in which the knee airbag is mounted.

Particularly, when the distance between the cockpit and the passenger increases depending on a seated state of the passenger, the time required to restrain the knees of the passenger is further delayed.

Accordingly, it is possible to consider a method of increasing the volume of the airbag cushion in order to quickly restrain the knees of the passenger. However, in this case, since an airbag package inevitably increases, it is difficult to secure the space in which the knee airbag is mounted. Further, since the weight of the airbag cushion increases, the airbag cushion is deployed while sagging downwards, thereby impeding rapid deployment of the airbag cushion.

The information disclosed in this Background of the Invention section is only for enhancement of understanding of the general background of the invention, and should not be taken as an acknowledgement or any form of suggestion that this information forms the related art already known to a person skilled in the art.

SUMMARY OF THE INVENTION

Therefore, the present invention has been made in view of the above problems, and it is an object of the present invention to provide a knee airbag configured to rapidly restrain the knees of a passenger and reduce the risk of injury to the passenger by changing a deployment angle of the airbag depending on a seated state of the passenger.

In accordance with the present invention, the above and other objects can be accomplished by the provision of a knee airbag including an airbag module coupled to a hinge structure inside a cockpit and configured to rotate around the hinge structure to change a deployment direction of a cushion, a driving unit configured to provide rotational force to the airbag module, and a controller configured to adjust a rotation angle of the airbag module by operating the driving unit based on a seated state of a passenger.

The hinge structure may be provided on a left side and a right side of a vehicle, and the hinge structure may have one end thereof connected to a vehicle body and the other end thereof connected to the airbag module.

The cockpit may have a cover formed therein, the cover having a tear line formed therein, and the rotation angle of the airbag module may be changed within the cover.

The airbag module may be embedded in an upper portion of the cockpit, and the rotation angle of the airbag module may be changed between a direction in which the airbag module is oriented to face a space at a lower portion of the cockpit and a direction in which the airbag module is oriented to face a space in front of the knees of the passenger.

The controller may be configured to adjust the rotation angle of the airbag module so that the airbag module is oriented to face a space at a lower portion of the cockpit and the cushion is deployed in the space at the lower portion of the cockpit when the passenger is seated in a normal mode, and to adjust the rotation angle of the airbag module so that the airbag module is oriented to face a space in front of the knees of the passenger and the cushion is deployed in the space in front of the knees of the passenger when the passenger is seated in a relaxation mode or in a long slide mode.

The knee airbag may further include a sensor configured to detect a posture of the passenger and a state of a seat, and the controller may analyze data transmitted from the sensor to determine the seated state of the passenger.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
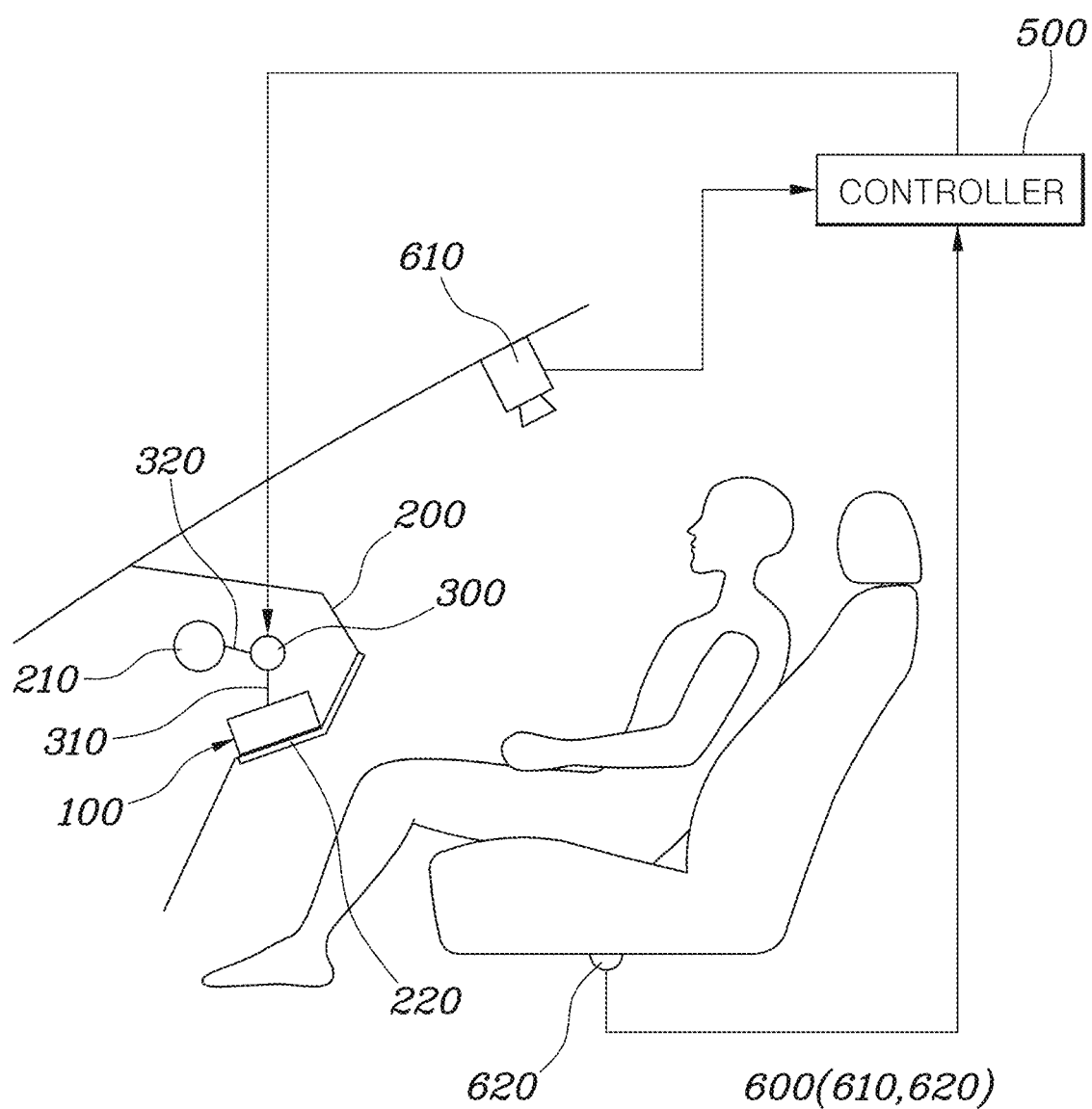
FIG. 1 is a view showing a structure in which an airbag module according to the present invention is installed inside a cockpit.

Reference will now be made in detail to the preferred embodiments of the present invention, examples of which are illustrated in the accompanying drawings. Wherever possible, the same reference numbers will be used throughout the drawings to refer to the same or like parts.

Specific structural or functional descriptions given in connection with the embodiments of the present invention disclosed in the specification or the application are merely illustrative for the purpose of describing embodiments according to the present invention. Further, the present invention may be implemented in various forms, and should not be construed as being limited to the embodiments described in the specification or the application.

Since the embodiments according to the present invention may be variously modified and may have various forms, specific embodiments are illustrated in the drawings and described in detail in the specification or the application. However, it should be understood that the embodiments according to the concept of the present invention are not intended to be limited to the specific disclosed forms, and include all modifications, equivalents, and substitutes that fall within the spirit and technical scope of the present invention.

Meanwhile, in the present invention, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concept of the present invention.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween. Other expressions for the description of relationships between components, such as "between" and "directly between" or "adjacent to" and "directly adjacent to", should be interpreted in the same manner.

The terms used in the specification are only used to describe specific embodiments, and are not intended to limit the present invention. In this specification, an expression in a singular form also includes the plural sense, unless clearly specified otherwise in context. It should be understood that expressions such as "comprise" and "have" in this specification are intended to designate the presence of indicated features, numbers, steps, operations, components, parts, or combinations thereof, but do not exclude the presence or addition of one or more features, numbers, steps, operations, components, parts, or combinations thereof.

Unless otherwise defined, all terms used herein, including technical and scientific terms, have the same meanings as commonly understood by those skilled in the art to which the present invention pertains. Terms such as those defined in commonly used dictionaries should be interpreted as having meanings consistent with their meanings in the context of the related technology. Further, unless explicitly defined in this specification, the terms should not be interpreted in an ideal or overly formal sense.

Hereinafter, the present invention will be described in detail through preferred embodiments thereof with reference to the accompanying drawings.

Figure 2:
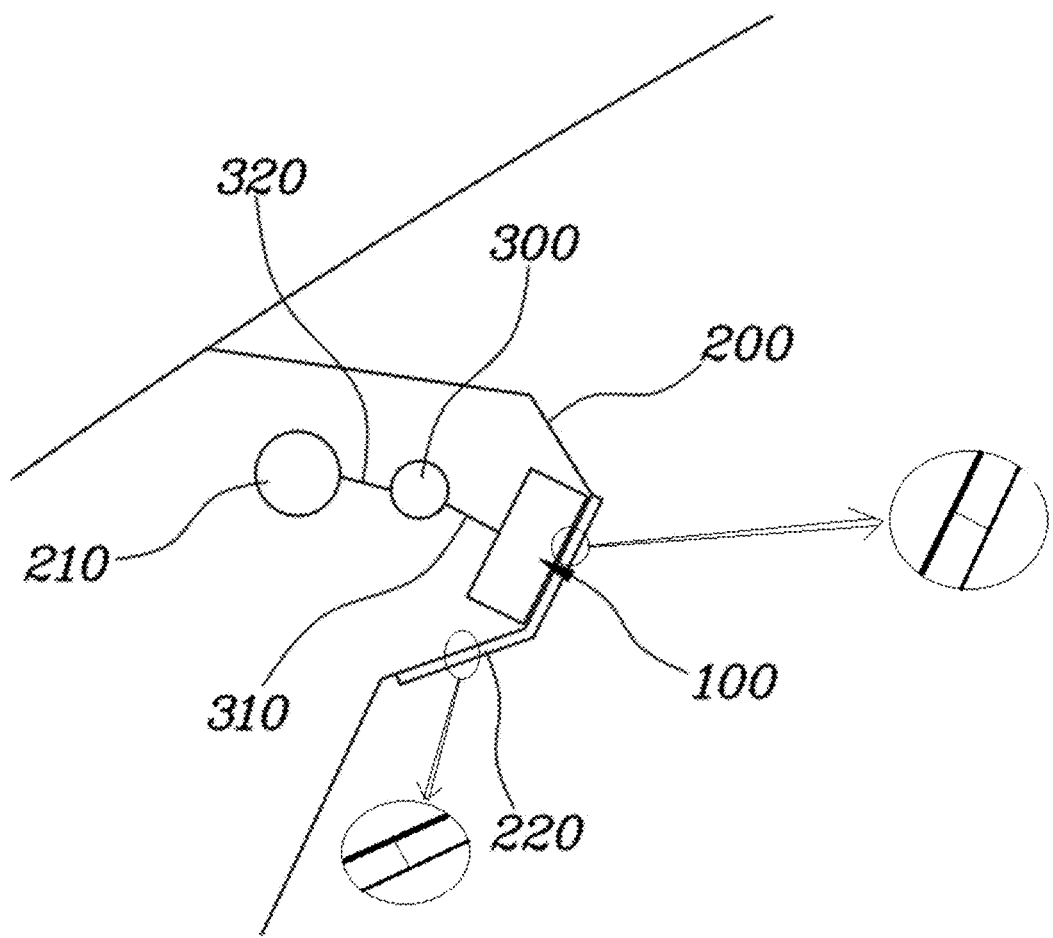
FIG. 2 is a view showing a state in which the airbag module according to the present invention is rotated toward a passenger.

FIG. 1 is a view showing a structure in which an airbag module 100 according to the present invention is installed inside a cockpit 200, FIG. 2 is a view showing a state in which the airbag module 100 according to the present invention is rotated toward a passenger, and a knee airbag of the present invention is applicable to the slim cockpit 200.

Referring to the drawings, the knee airbag of the present invention is formed of the airbag module 100 coupled to a hinge structure 300 inside the cockpit 200 and configured to rotate around the hinge structure to change a direction in which the cushion 110 is deployed, a driving unit 400 configured to provide rotational force to the airbag module 100, and a controller 500 configured to adjust a rotation angle of the airbag module 100 by operating the driving unit 400 based on a seated state of a passenger.

For example, the hinge structure 300 is installed inside an upper portion of an instrument panel forming the cockpit 200, and the airbag module 100 is rotatably mounted on the hinge structure 300.

The airbag module 100 has a cushion 110 embedded therein, and an inflator (not shown) is connected to the cushion 110. Here, in the event of vehicle collision, gas generated by explosion of the inflator is provided to the cushion 110 to deploy the same.

In addition, the driving unit 400 may be a motor. A shaft of the motor is connected to the hinge structure 300, thereby providing rotational force to the airbag module 100 connected to the hinge structure 300 in response to the operation of the motor.

Further, the controller 500 is configured to detect a seated state of a passenger seated on a seat, to determine a seated mode of the passenger, that is, a normal mode, a relaxation mode, a long slide mode, and the like based on the detected seated state of the passenger, and to control the operation of the motor so that the airbag module 100 is rotated to appropriately deploy the cushion 110 in consideration of the corresponding seated state of the passenger.

That is, since the airbag module 100 is rotated in consideration of the seated state of the passenger seated on the seat, a deployment direction of the cushion 110 is changed depending on a change in the rotation angle of the airbag module 100.

Therefore, the knees of the passenger located far from the cockpit 200 are restrained quickly and stably without increasing the package of the cushion 110, thereby reducing the risk of injury to the passenger. In addition, since the package of the cushion 110 is not increased, sagging of the cushion 110 is prevented, thereby maintaining deployment performance of the cushion 110.

Figure 3:
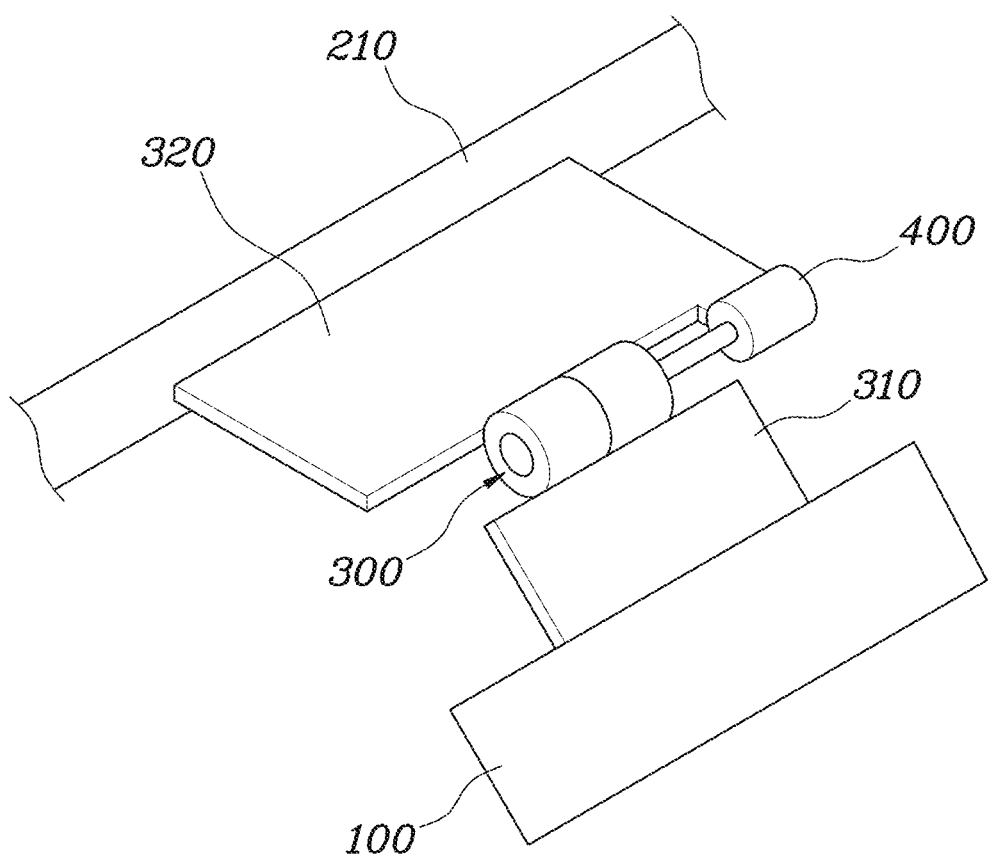
FIG. 3 is a view showing a configuration in which the airbag module according to the present invention is rotatably connected to a hinge structure.

Further, FIG. 3 is a view showing a configuration in which the airbag module 100 according to the present invention is rotatably connected to the hinge structure 300.

Referring to FIG. 3, the hinge structure 300 may be provided on the left and right sides of a vehicle, a vehicle body may be connected to one end of the hinge structure 300, and the airbag module 100 may be connected to the other end of the hinge structure 300.

For example, the hinge structure 300 is formed of a fixing part provided in the fixed state inside the cockpit 200, and a rotation part shaft-coupled to the fixing part and configured to rotate relative to the axis thereof. Here, a shaft to which the fixing part and the rotation part are coupled is formed to extend in the left-and-right direction of the vehicle.

In front of the hinge structure 300, a cowl bar 210 connected to the vehicle body is disposed on the left and right sides, and the cowl bar 210 and the fixing part are connected to each other by a cowl bracket 320.

Further, one end of an airbag bracket 310 is fixed to the rotation part, and the airbag module 100 is fixed to the other end of the airbag bracket 310.

In addition, the shaft of the motor is coupled to the rotation part, and the motor is fixed to the cowl bracket 320.

That is, when the motor rotates, the rotational force of the motor causes the rotation part to rotate relative to the fixing part, and as such, the airbag module 100 rotates at the same angle as the rotation angle of the rotation part together with the airbag bracket 310 coupled to the rotation part.

Accordingly, the cushion 110 embedded in the airbag module 100 also rotates, thereby making it possible to change the direction in which the cushion 110 is deployed depending on the rotation angle of the airbag module 100.

Additionally, in the present invention, a cover 220 having a tear line may be formed in the cockpit 200, and the rotation angle of the airbag module 100 may be changed within the cover 220.

That is, the cover 220, having the tear line formed therein, is fixed to the cockpit 200, and the cushion 110 is deployed outside the cover 220 while tearing the tear line formed in the cover 220.

Accordingly, the rotation angle of the airbag module 100 is configured to rotate within a range that does not deviate from the tear line formed in the cover 220.

Figure 4:
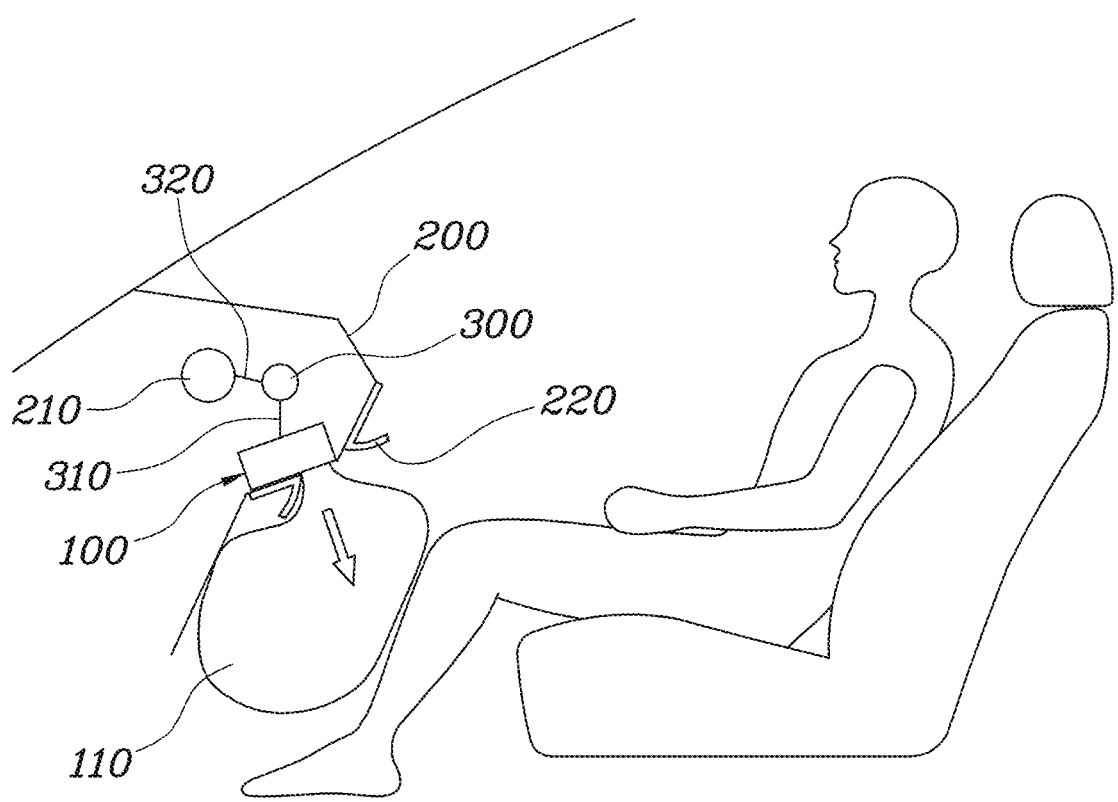
FIG. 4 is a view showing a state in which a cushion in FIG. 1 is deployed.
Figure 5:
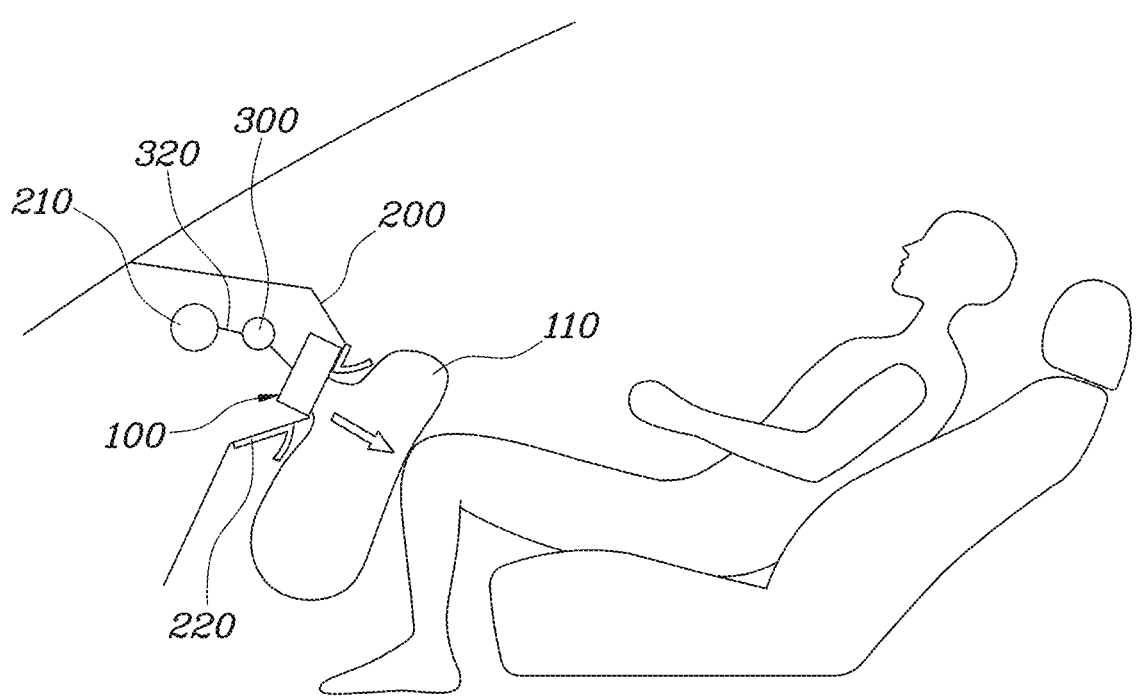
FIG. 5 is a view showing a state in which the cushion in FIG. 2 is deployed.

Meanwhile, FIG. 4 is a view showing a state in which the cushion 110 in FIG. 1 is deployed, and FIG. 5 is a view showing a state in which the cushion 110 in FIG. 2 is deployed.

Referring to the drawings, the airbag module 100 may be embedded in the upper portion of the cockpit 200, and the rotation angle of the airbag module 100 may be changed between a direction in which the airbag module 100 is oriented to face a space at the lower portion of the cockpit 200 and a direction in which the same is oriented to face a space in front of the knees of a passenger.

To this end, when the passenger is seated in the normal mode, the controller 500 adjusts the rotation angle of the airbag module 100 so that the airbag module 100 is oriented to face the space at the lower portion of the cockpit 200 and the cushion 110 is deployed in the space at the lower portion of the cockpit 200. Meanwhile, when the passenger is seated in the relaxation mode or in the long slide mode, the controller 500 adjusts the rotation angle of the airbag module 100 so that the airbag module 100 is oriented to face the space in front of the knees of the passenger and the cushion 110 is deployed in the space in front of the knees of the passenger.

That is, in the state in which the passenger is normally seated on the seat, a distance between the knees of the passenger and the airbag module 100 is an appropriate distance. Accordingly, each of the knees of the passenger and the airbag module 100 is appropriately positioned.

In this case, the airbag module 100 is rotated toward the lower portion of the cockpit 200 located in the front part of the feet of the passenger, thereby allowing the cushion 110 to be deployed in the space at the lower portion of the cockpit 200. In this manner, the cushion 110 supports the knees of the passenger.

On the other hand, when the passenger is lying on the seat or the seat is moved rearwards, the distance between the knees of the passenger and the airbag module 100 is relatively large.

In this case, the airbag module 100 is rotated toward the knees of the passenger, and the cushion 110 is deployed in the space in front of the knees of the passenger, thereby supporting the knees of the passenger.

Meanwhile, referring to FIG. 1, the present invention may include a sensor 600 configured to detect a posture of the passenger and a state of the seat, and the controller 500 may analyze data transmitted from the sensor 600 to determine the seated state of the passenger.

For example, the sensor 600 may include an image-capturing sensor 610 and a seat sensor 620.

The image-capturing sensor 610 is a camera or a radar installed inside the vehicle. For example, the image-capturing sensor 610 may be installed in an upper portion of a windshield or a roof part. The image-capturing sensor 610 captures the posture of the passenger seated on the seat, the position of the seat, the angle of a seatback, and the like, and inputs data of a captured image to the controller 500.

The seat sensor 620 is installed on a seat cushion and/or a seatback to detect the pressure or load of the passenger seated on the seat and the angle of the seatback. Further, the seat sensor 620 inputs detected data to the controller 500.

Accordingly, when the data provided by the image-capturing sensor 610 and the data provided by the seat sensor 620 are input to the controller 500, the controller 500 analyzes the posture of the passenger based on these data, thereby determining the current seated state of the passenger.

The controller 500 according to the embodiment of the present invention may be implemented by an algorithm configured to control the operation of various components of a vehicle, a nonvolatile memory (not shown) configured to store data related to software instructions that execute the algorithm, or a processor (not shown) configured to perform operations described below using the data stored in the memory. Here, the memory and the processor may be implemented as separate chips. Alternatively, the memory and the processor may be implemented as a single chip in which the memory and the processor are integrated with each other. The processor may take the form of one or more processors.

Hereinafter, deployment operation of the knee airbag according to the present invention will be described.

In the driving process of a vehicle, the sensor 600 installed in the interior of the vehicle is used to detect the posture of a passenger and a seat, and the controller 500 determines the seated state of the passenger based on the detected data.

Accordingly, the controller 500 applies an operation command to the motor so as to change the direction in which the cushion 110 is deployed depending on the seated state of the passenger, thereby changing the angle of the airbag module 100.

In this case, the angle of the airbag module 100 is controlled to be changed in real time depending on the seated state of the passenger during driving, thereby immediately responding to a vehicle collision situation.

Meanwhile, when a vehicle collision occurs and an inflator of the knee airbag explodes, gas of the inflator is injected into the cushion 110 so that the cushion 110 is inflated.

Here, when a vehicle collision occurs in the state in which the passenger is seated on the seat in the normal mode, the airbag module 100 is adjusted downwards to be oriented to face the lower portion of the cockpit 200, and as such, the cushion 110 is deployed downwards toward a portion at which the feet of the passenger are placed to support the knees of the passenger, thereby reducing the risk of injury to the lower extremities of the passenger.

Of course, when a vehicle collision occurs in the state in which the passenger is seated on the seat in the relaxation mode or in the long slide mode, the airbag module 100 is adjusted upwards toward the knees of the passenger, and as such, the cushion 110 is deployed toward the knees of the passenger to support the knees of the passenger, thereby reducing the risk of injury to the lower extremities of the passenger.

As described above, according to the present invention, since the airbag module 100 is rotated depending on the seated state of the passenger seated on the seat, the deployment direction of the cushion 110 is also changed depending on the change in the rotation angle of the airbag module 100.

Therefore, the knees of the passenger located far from the cockpit 200 are restrained quickly and stably without increasing the package of the cushion 110, thereby reducing the risk of injury to the passenger. In addition, since the package of the cushion 110 is not increased, sagging of the cushion 110 is prevented, thereby maintaining deployment performance of the cushion 110.

As is apparent from the above description, according to the present invention, an airbag module is rotated depending on a seated state of a passenger seated on a seat, thereby making it possible to change a deployment direction of a cushion depending on a change in a rotation angle of the airbag module.

Therefore, the knees of the passenger located far from a cockpit are restrained quickly and stably without increasing a package of the cushion, thereby having an effect of reducing the risk of injury to the passenger. Further, since the package of the cushion is not increased, the cushion is prevented from sagging, thereby having an effect of maintaining deployment performance of the cushion.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A knee airbag comprising:
   an airbag module adapted to be coupled to a hinge structure inside a cockpit and configured to rotate around the hinge structure to change a deployment direction of a cushion;
   a driving unit configured to provide rotational force to the airbag module; and
   a controller configured to adjust a rotation angle of the airbag module by operating the driving unit based on a seated state of a passenger.

2. The knee airbag according to claim 1, wherein:
   the hinge structure is provided on a left side and a right side of a vehicle, and
   the hinge structure has one end connected to a vehicle body and another end connected to the airbag module.

3. The knee airbag according to claim 1, wherein:
   the cockpit has a cover having a tear line formed therein, and
   the rotation angle of the airbag module is changed within the cover.

4. The knee airbag according to claim 1, wherein:
   the airbag module is embedded in an upper portion of the cockpit, and
   the rotation angle of the airbag module is changed between a direction in which the airbag module is oriented to face a space at a lower portion of the cockpit and a direction in which the airbag module is oriented to face a space in front of the knees of the passenger.

5. The knee airbag according to claim 1, wherein the controller is configured to:
   adjust the rotation angle of the airbag module so that the airbag module is oriented to face a space at a lower portion of the cockpit and the cushion is deployed in the space at the lower portion of the cockpit when the passenger is seated in a normal mode, and
   adjust the rotation angle of the airbag module so that the airbag module is oriented to face a space in front of the knees of the passenger and the cushion is deployed in the space in front of the knees of the passenger when the passenger is seated in a relaxation mode or in a long slide mode.

6. The knee airbag according to claim 1, further comprising a sensor configured to detect a posture of the passenger and a state of a seat,
   wherein the controller analyzes data transmitted from the sensor to determine the seated state of the passenger.

* * * * *